United States Patent [19]

Scribner

[11] 4,249,613
[45] Feb. 10, 1981

[54] CULTIVATING APPARATUSES AND PROCESS

[76] Inventor: Charles G. Scribner, Box 933, Dalhart, Tex. 79022

[21] Appl. No.: 865,310

[22] Filed: Dec. 28, 1977

[51] Int. Cl.³ .............................................. A01B 39/08
[52] U.S. Cl. ................................... 172/60; 172/520; 172/69; 172/121; 172/552; 172/184
[58] Field of Search ............... 172/184, 187, 106, 121, 172/552, 51, 52, 50, 60, 57, 554, 68, 69, 520

[56] References Cited

U.S. PATENT DOCUMENTS

| | | | |
|---|---|---|---|
| 841,840 | 1/1907 | Zastrow | 172/60 |
| 949,686 | 2/1910 | Redmond | 172/52 |
| 1,293,146 | 2/1919 | McMorran | 172/121 |
| 1,650,400 | 11/1927 | Stark | 172/554 |
| 2,066,610 | 1/1937 | Carlin | 172/184 X |
| 2,163,726 | 6/1939 | Blunt | 172/69 |
| 2,317,188 | 4/1943 | Hanson | 172/60 |
| 2,644,386 | 7/1953 | Sutton | 172/60 |
| 3,071,198 | 1/1963 | Blocker | 172/60 X |
| 3,202,221 | 8/1965 | Monk | 172/60 X |
| 3,970,012 | 7/1976 | Jones | 172/520 X |

*Primary Examiner*—Richard J. Johnson
*Attorney, Agent, or Firm*—Ely Silverman

[57] ABSTRACT

The apparatuses comprise a horizontally extending rigid frame and a plurality of reel and shaft assemblies, those reel and shaft assemblies each comprising a pair of parallel axle shafts and a set of reels rotatably supported on each of said shafts; the peripheral edges of ground engaging blades on a first set of rotatable reels meet the ground in the treated path at a first angle to or parallel to the central longitudinal axis of a first shaft on the frame and the peripheral edges of the ground engaging blades on a second set of rotatable reels meet the ground to form cuts therein at an angle to the line of the edge of the blades of the first set of reels. The apparatus serves to form a first series of cuts extending transversely to the path of the apparatus between row crops and a second series of cuts at an angle to the first series of cuts; accordingly, such apparatuses arrange the earth originally in those paths into relatively uniformly sized particulate porous masses and maintain the biological activity of the bacteria content in the soil.

The field of art to which this invention pertains is laterally spaced rolling cultivators.

5 Claims, 15 Drawing Figures

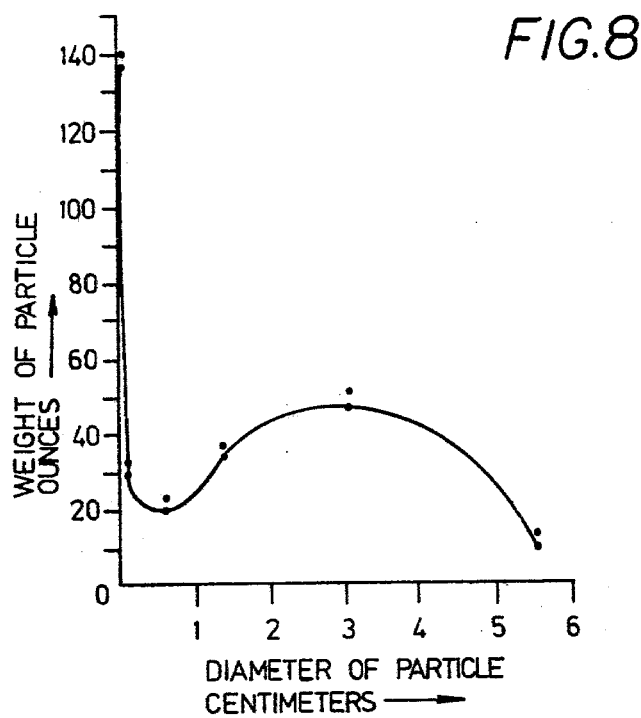
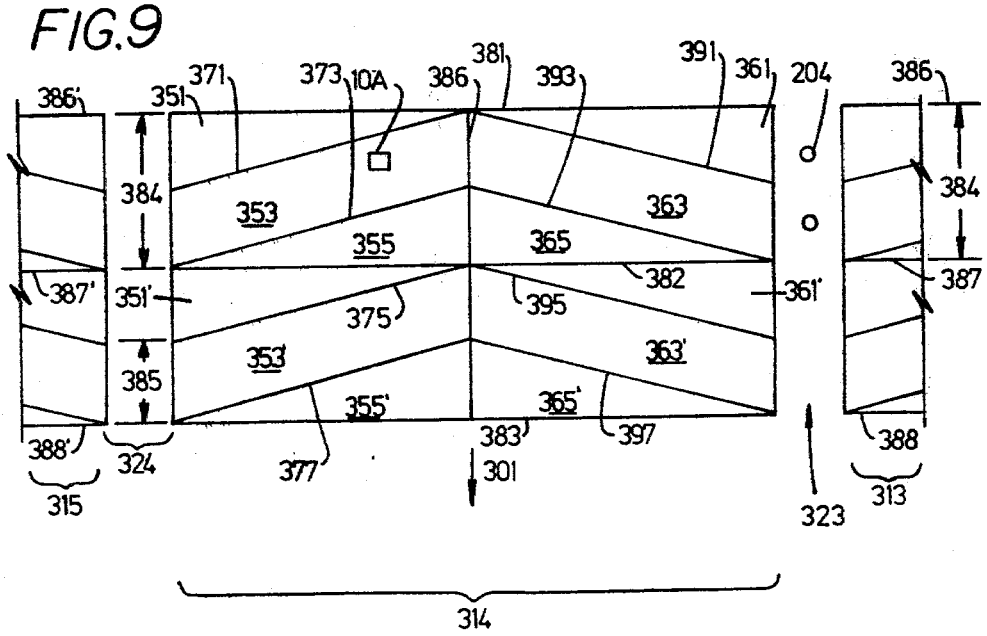

CULTIVATING APPARATUSES AND PROCESS

THE PRIOR ART

While prior apparatuses utilizing cultivating elements drawn one behind the other are known; e.g., U.S. Pat. Nos. 3,592,291; 3,487,883; 2,319,225, there has not yet been provided apparatuses which rapidly provide in large scale and automatically a uniform and desirable porosity of tilled earth having controlled maximum particle size and good particle size distribution. Conventional apparatuses create large clods of earth located between row crops in the procedure of breaking and do not provide either for the provision of a maximum to the particle sizes as would best assist plant growth or, in such operations, so controlling the resulting particle sizes that porosity is preserved by avoiding undesirable pulverization of the earth.

SUMMARY OF THIS INVENTION

The disclosed apparatuses produce a first limited depth of cutting and delineation of areas of repeated uniform size and shape; concurrently a turning action is applied to such cut areas of uniform area and depth, and a uniformly porous earth is provided. Such product of controlled particle size is, by this apparatus and process, also moved gently and effectively toward nearby plant stalks. The resulting porosity increases water retention and aeration while maximum limitations are put on the particle size provided by the apparatuses of this invention (about five centimeters). The size distribution of particles created are, also moved toward the larger proportions of such particle sizes; i.e., most of the particle sizes produced are in the range of one to five centimeters so that the bacterial activity in the content of such particles is preserved.

BRIEF DESCRIPTION OF THE DRAWINGS

FIG. 8 is a graphical showing of particle sizes produced by the action of apparatus 24.

FIG. 9 is a diagrammatic showing of the pattern of cuts made by the blades of the reels of embodiment 24 on the earth 23 on which such reels operate in an array of apparatus as shown in FIGS. 1, 2, and 3. Such pattern of cuts would appear in a zone as zone 9A of FIG. 2.

DESCRIPTION OF THE PREFERRED EMBODIMENT

The system of this invention comprises a tractor 22, an apparatus 21 and the land 23 on which the apparatus and tractor operate.

Figure 1:
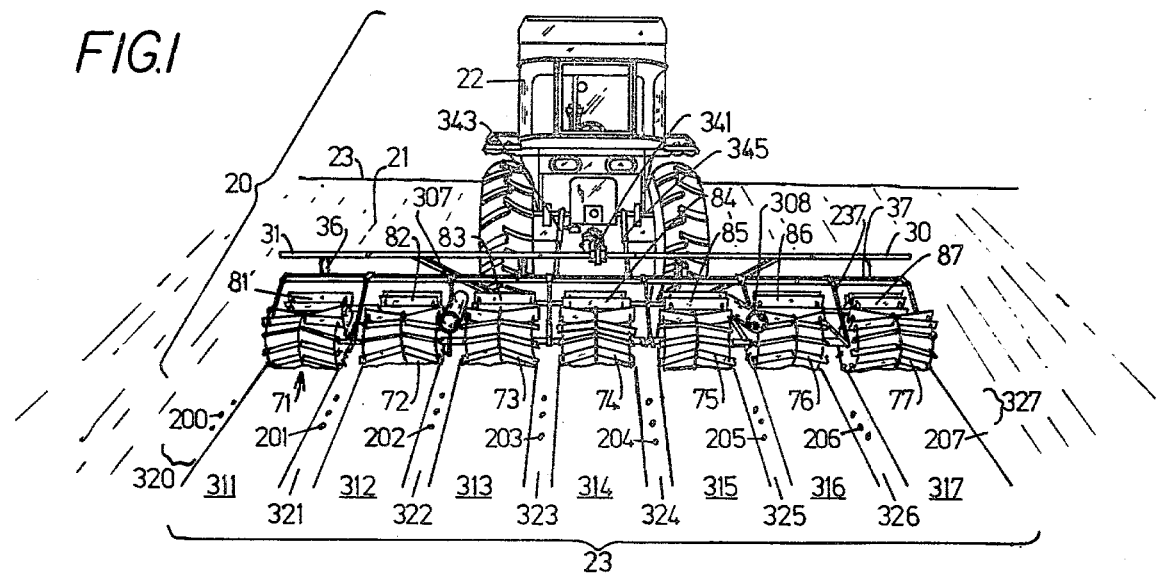
FIG. 1 is a rear view of an apparatus according to this invention connected to a tractor and moving over a field during operation thereon by the apparatus.
Figure 2:
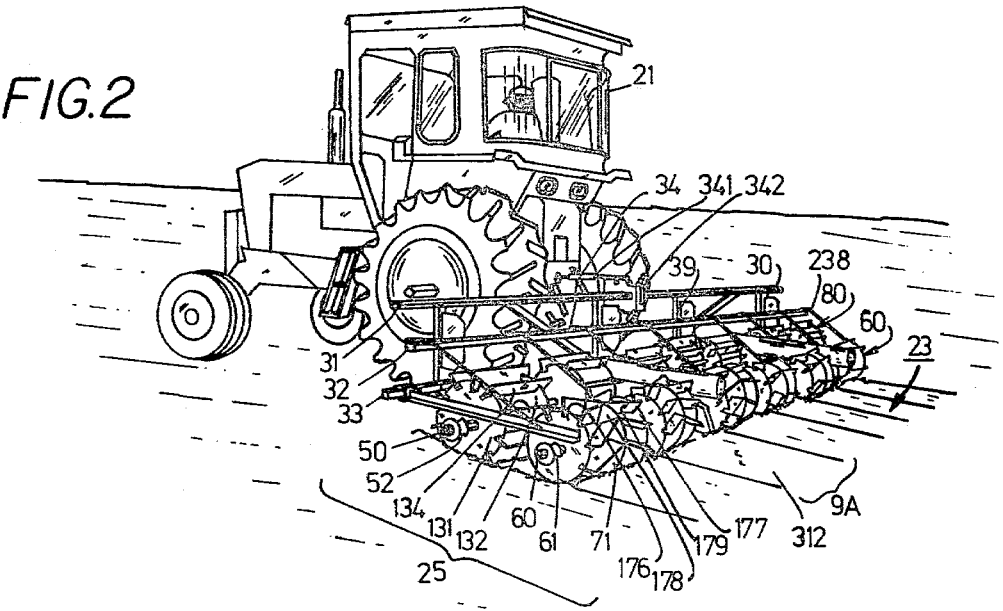
FIG. 2 is a side view of the apparatus shown in FIG. 1 as seen along direction of arrow 2A of FIG. 4.
Figure 3:
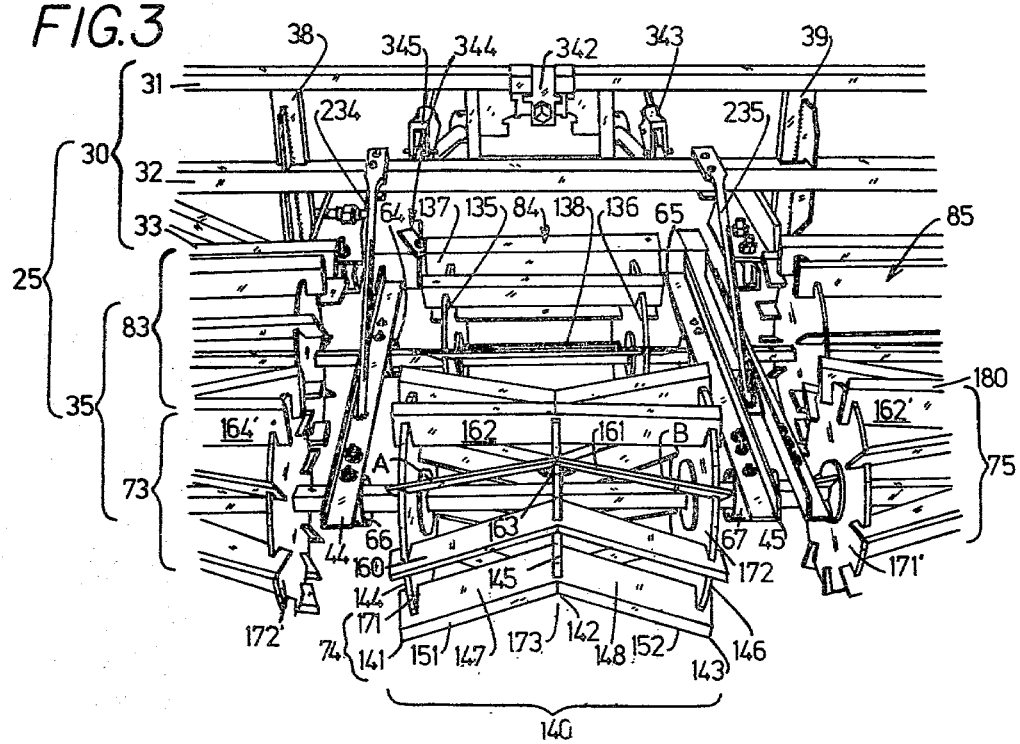
FIG. 3 is a top rear oblique view of the portion of apparatus shown in zone 3A of FIG. 4.

The apparatus 21 in one embodiment of apparatus according to this invention, embodiment 25, comprises a frame, 30 and a reel assembly 35. The frame comprises a front transverse member 31, a middle transverse member 32, and a lower transverse member 33. These members are arrayed as shown in FIGS. 1, 2, and 3. Members 31, 32, and 33 are rigid, straight, horizontal channel members made of steel. Members 31, 32, and 33 are attached to rigid vertical frame members 36, 37, 38, and 39, as shown in FIGS. 1, 2, and 3. The frame members 31 and 32 are firmly attached to a hitch 34. The hitch is attached to the frame of the tractor 21 in conventional manner to allow the frame to be lifted for purposes of maneuvering the tractor and apparatus 21. The frame 30 also comprises rigid longitudinal members 41-48 (see FIG. 4); each member as 41 extends horizontally and is attached at its front end to the lower transverse front member and extends from the front member rearwardly. Rearwardly and downwardly extending truss support members as (234, 235, and 238) extend from frame member 32 to the longitudinal member as 41-48 (as shown for members 44, 45, and 48).

A front reel shaft 50 is rigid and straight and extends across the frame 30 from the left side longitudinal member 41 to the right side longitudinal member 48. Front and rear journal housings are provided and firmly attached to the bottom of each of the longitudinal members 41-48. The housing of front journal 64 and rear journal 66 on longitudinal member 44 and front journal housing 65 and rear journal housing 67 on member 45 are typical of such journal housings provided on each of the longitudinal members 41-48.

The front reel shaft 50 is rotatably attached at journals as 64 and 65 to each longitudinal member 41-48; e.g., at journal 51 to member 41 and at a journal as 52 at member 42 and at journal 64 to member 44, at journal 65 to member 45, at journal 53 to member 46 and at journal 54 to the member 44.

A rear reel shaft 55 is rigid and straight and rotatably supported on each of longitudinal members 41-48. That shaft 55 is rotatably supported on each of those longitudinal members by journal bearings as 56 on member 41, journal 57 on member 43, journal 58 on member 53, journal 59 on member 48, as diagrammatically shown in FIG. 4 and like bearing members on longitudinal members 42, 44, 45, and 47, as also shown at journal 66 on member 44 and at journal 67 on longitudinal member 45.

Thereby a rear reel assembly 60 is formed of an outboard left rear reel assembly 61, a center reel assembly 62 and an outboard right rear reel assembly 63. The left outboard rear or driven reel assembly comprises a left outboard reel 71 and a left inboard reel 72. The center reel assembly comprises the central left outboard reel 73, the center middle reel 74 and the central right outboard member 75. The right outboard reel driven assembly comprises a right inboard driven reel 76 and the right outboard driven reel 77. Each of reels 71–77 is alike in structure and is firmly attached to the shaft 55, and is a rear reel.

Each of the reels 81–87 is alike and is firmly attached to the shaft 50. Each of the rear reel assemblies are alike to the reel 74 shown in FIG. 3 and is firmly attached to the shaft 55. Each of the front reel assemblies are alike to the reel 84 shown in FIG. 3 and is firmly attached to the shaft 50 and is a front reel.

The front reel assembly 80 comprises the left outboard driving reel 81 and the left inboard driving reel 82, a central outboard left driving reel 83, a central center driving reel 84, a central right outboard reel 85, a right inboard driving reel 86 and a right outboard driving reel 87.

Figure 4:
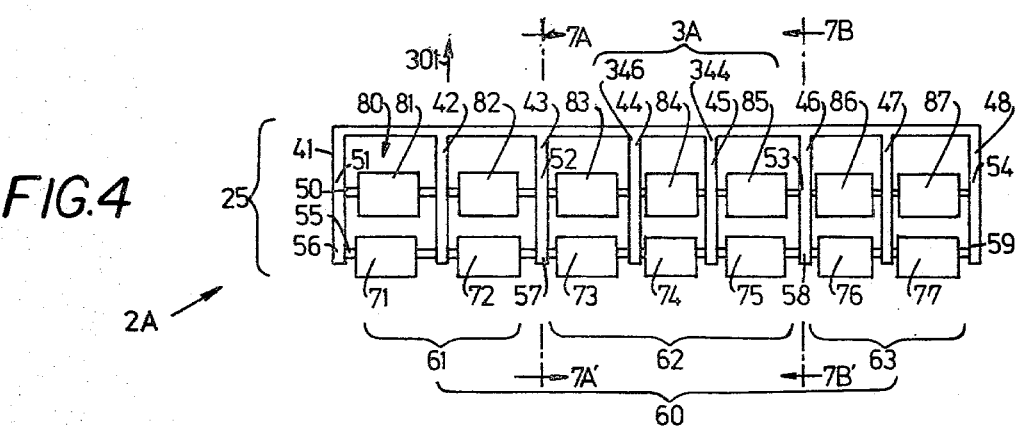
FIG. 4 is a diagrammatic top view of the major components in the reel and frame assembly of embodiment 25.

The attachment of the hitch 34 to frame 30 is by arm 341 to the top and center of frame 30, by lower left arm 343 and by lower right arm 345. Arm 341 is attached to the frame 30 at the connection 342. The left arm is attached as at point 344 to the frame 30 above and at front end of the member 45. The right hitch arm 345 is attached hingedly at attachment 346 to the 30 near front end of member 44 as shown in FIG. 4. The attachments of the hitch 34 to the frame 30 of apparatus 24 provides that the apparatus 24 may be moved upward and downward relative to the frame of tractor 21 to adjust the depth of the cuts made by the blades of the reels as 71–77 and 81–87 into the ground 23. The arms 343 and 345 of the hitch may be adjusted to control the angle of the frame 30 relative to the ground so the height of axles 55 and 50 relative to each other and to the ground may be adjusted to accommodate to soils of different toughness at any given speed of the tractor whereby a smooth and even operation results.

Front reel 81 comprises a rigid, circular left side plate 131 and a rigid circular right side plate 132. Those plates are firmly fixed to the shaft 50. Each of a series of like blades such as 134 each rigid and rectangular in shape and having a straight outer edge is firmly attached to the plates 131 and 132. Each of these blades, as 134, is rectangular in shape and has a sharp radial edge and is firmly attached to the plates at evenly spaced apart lines of attachment at the edge of those plates.

The reel unit 84 is composed of left side plate 135, a right side plate 136 and ten like blades, as 137, 138; 137 is shown viewed perpendicular to its flat surface. Blade 138 is shown viewed along its cutting edge and parallel to the flat surface of that blade. Plates 131,132,137 and 138 are alike; plates 137, 138 & 134 are alike.

Each of the rear reels 71–77 are alike and the description given for rear reel 74 applies for all of the group of 71–77. The reel 74 (and each of the like rear reels 71–77) comprise three vertically extending flat circular rigid plates, as 171, 172, and 173 and a plurality of like V-shaped blades, as 140, 160, 161, and 162 extending horizontally.

The left rear reel plate 171 is circular and provided with slots to seat the blades, as 140, 160, 161, and 162. That plate 171 is, also, perpendicular to and firmly attached to shaft 65. The right rear reel plate 172 is circular, rigid, perpendicular to and firmly attached to the shaft 55, and has the same thickness or size and/or diameter as well as shape as the plate 171 and is slotted at the same positions relative to the shaft 55 in order to provide seating for each of the ten blades attached thereto, as 140, 160, 161, and 162. The center reel plate 173 is circular and rigid and perpendicular to and firmly attached to the shaft 55. It is provided with slots for seating all the V-shaped blades, as 140, 160, 161, and 162, but the position of the slots in plate 173 is slightly off-set from the position of the slots in plates 171 and 162 to fit and support the V-shaped configuration of the blades, as 140, 160, 161, and 162. The seats in the plate 173 for the blades, as 140, are all of the same size and shape and allow for a full contact of each V-shaped blade with the ground, but the circular plate 173 is as shown in FIG. 3 slightly larger in diameter than the plates 171 and 173 by an amount almost equal to the amount of radial projection of the blades from the outer or radial edge of the plates 171 and 172. In FIG. 2 where there is shown left reel side plate 176 and right reel side plate 177, the outer edge of center reel plate 178 of reel 71 does not extend radially from the shaft 55 as far as do the radial edges of each of the blades on that reel. That same relationship for blades and plates is shown in FIGS. 1 and 3 as well. FIG. 3 shows the different blades of the same reel 74 in different positions relative to the viewer so that the configuration of the like V-shaped blades is shown as seen from (a) a position normal to the junction line of the "V" as in blade 162, and (b) from a position looking along the edge of the blade at blade 161 and parallel to the flat surfaces of that blade while FIG. 3 also (c) shows the V-shaped blade 140 as seen obliquely.

Figure 7:
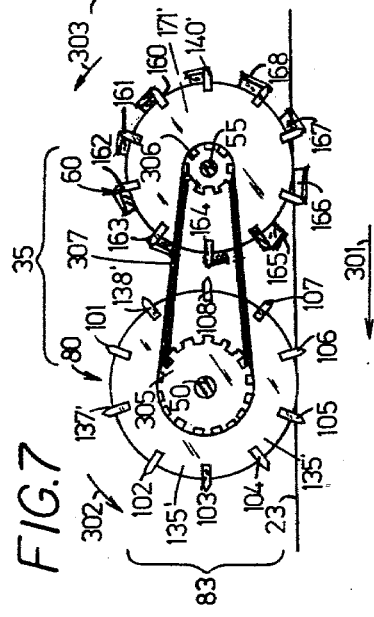
FIG. 7 diagrammatically shows the relations of the drive chain and bladebearing reels and axles therefor in embodiment 24 as seen along the vertical section 7A—7A' of FIG. 4.

FIG. 7 shows blades of reels 83 and 73. It shows blades 140', 160', 161', and 162' on reel 73 corresponding to blades 140, 160, 161, and 162 of rear reel 74 and also shows other numbered blades 163–168 corresponding to like blades of reel 74 (and not shown numbered). FIG. 7 does show that 138' and 137' on reel 83 corresponding to blades 138 and 137 on reel 84. FIG. 7 also shows the position of other numbered blades 101–108 corresponding to like blades in reel 84 (not shown numbered). The rear reel 74 carries ten like V-shaped blades 140 and 160, 161, & 162, such ten blades all equally spaced about shaft 55. The blades 140, 161, and 162 show different views of such like blades. In FIG. 3 position of blade 140 its outer or radial left corner 141, the outer or radial central corner 142 and a right outer or radial corner 143 are seen. In that position of V-shaped blade on reel 74, the blade 140 also shows its left inner (as opposed to radial) corner 144, and inner (as opposed to radial) central corner 145 and a right side inner (or non-radial) corner 146.

The blade 140, like the other blades on reel 74, is composed of a first, left side, rectangular flat rigid plate 147 and a second, right side, rectangular, flat rigid plate 148 with a solid angle (163 shown on blade 161) between such flat rigid plates.

The blade 161 is similarly composed of a rigid left side plate (A) and a rigid right side plate (B). In the position of blade 161 that blade 161 shows a rigid left plate portion A and a rigid right plate portion B; portion A is joined to plates 173 and 171 and plate portion B is joined to plates 172 and 173 with an obtuse angle 163 between portions A and B of plate 161. Plate 162 is shown viewed perpendicular to the line of junction of portions A & B. As viewed from the right hand side of FIG. 3, the central portion of each of the blades, as 140, 161, 161 and 162 is displaced clockwise of the portion of that blade attached to the side plates 171 and 172 on the same reel (74).

FIG. 7 is a sectional diagrammatic view along the vertical plane shown by section 7A—7A of FIG. 4. The reel 83 has ten straight edged like blades radially and tangentially equally spaced therearound; i.e., 102, 103, 104, 105, 106, 107, 108, 138', and 137'. These blades are the same in size and shape as blades 137 and 138 of reel 84. Reel 73 comprises ten like V-shaped blades, 160', 161', 162', 163, 164, 165, 166, 167, 168, and 140' and reel side plates. All those V-shaped blades on that reel 73 are identical in size and shape and are equally radially and tengentially spaced about the periphery of the support plates therefor. The V-shaped blades 140', 160', 161', and 162' are the same in size and shape as V-shaped blades 140, 160, 161, and 162 of reel 74.

Those blades are attached to the reel side plates as 171' and 172' and center plate 173 in the same manner as the blades of reel 74 are attached to reel plates 171 and 172 and 173.

A rigid sprocket 305 is firmly attached to the shaft 50 and another rigid sprocket of exactly one half the diameter of the sprocket 305 is firmly attached to the shaft 55. A chain 307 extends in a substantially straight line from the top of toothed sprocket 305 to the top of toothed sprocket 306, is firmly wrapped around the teeth of such sprocket 306 and extends with only an operative amount of slack (e.g., ⅛ to 1/16 inch) from the bottom of sprocket 306 to the bottom of sprocket 305 and firmly engages the teeth of sprocket 305 and extends around sprocket 305 to be continuous with the top portion of the chain. The chain 307 provides for driving the shaft 55 by the shaft 50. The shaft 50 is driven by engagement of the teeth of the reels 81-87 to the ground and the shaft 55 by the sprocket 306. A like pair of sprockets and chain is attached to shafts 50 and 55 at section 7B—7B'.

In operation of the embodiment 25 of system 20 as shown and referred to in FIGS. 1-4 and 7-10 the reels of assemblies 80 and 60 move forward, in the leftward direction 301 as shown in FIG. 7, and rotate about the axles 50 and 55 in counterclockwise directions 302 (for shaft 50) and 303 for the shaft 55. The reels of assembly 60 then move in a longitudinal direction 301 at the same speed over the land as do the reels of assembly 80. However the reels of assembly 60 rotate at twice the rotation speed of the rotation speed of the reels 81-87 of assembly 80. The blades of the reels of assembly 80 engage into and cut into the ground to a depth substantially that of the length of extension of the edges of the blades beyond the edges of the plates as 136 and 137.

The apex of each of the V-shaped blades, as 140, 161, and 162 of each reel, as 74 and also 71-77 of assembly 60, such as the portions of each V-shaped blade forming angle 163 of blade 161 is directed forwardly; i.e., in the direction 301 at the top of the reel as shown in FIG. 3 and also FIGS. 1 and 2, but such apex is directed rearwardly when such blade contacts the ground.

Flat plates A and B of each V-shaped blade as 161 meet at vertex to form an angle, as 163, at which there is a straight line of junction between the component flat plates as A and B. The view of blade 162 in FIG. 3 is taken perpendicular to such a straight junction line on that blade (162).

During operation of the apparatus 25 the tractor 21 moves across a field, as 23, with rows of crops thereon (as rows 200-207) drawing the apparatus 25 therebehind. The apparatus 25 while so drawn is partly supported on the front reel side frame plates as 135 and 136 and partly by edges of the blades of all of the front or forward set of reels 80-87 and, also, partly by edges of the blades on each of the reels 71-77 and plates as 171, 172, and 173 on each of such reels. The hitch 34 is firmly attached at its front end to the frame of the tractor and is attached at its rear portions to the frame 30 of the apparatus 25 and provides for controlling the elevation of the apparatus 25 relative to the tractor and so provides for control of the relative height of the apparatus 25 and depth to which the reel plates, as 137, engage the ground 23 therebelow. Also, the vertically spaced apart connections 342, 344, and 346 of the hitch, as at rear end of arms 343 and 345 and 341 of the hitch control the angle to a degree at least of the frame 30 relative to the vertical, for the purposes of raising the entire apparatus 25 over the ground as needed as during turning of the apparatus at the end of a path of cultivation according to the use of this apparatus. The adjustment of such arms of the hitch also provide for controlling, at least to a degree, the force with which the edges of the blades of the rear set of reels engage the ground. The weight of the apparatus 25 (about 3,400 pounds) provides most of the force with which the edges of the blades of the reels 71-77 engage the ground for the cutting action effected thereby.

As the tractor 21 draws the apparatus 25 therebehind along the ground 23 the sharp edges of the blades of the reels 71-77 and 81-87 engage in the ground. The paths of each of the reels of apparatus 25 are generally as shown in FIG. 1, namely with the treated areas as 311-317 behind each of the rear reels as 71-77, as shown in FIGS. 1 and 2, and also, with untreated areas 321-326 between the treated areas; e.g., uncut or crop growth area 323 between paths 313 and 314 and another uncut or crop growth area 324 (to the right as shown in FIG. 1 of the path 313) which area 324 is located between the cut areas 313 and 314. Similarly an uncut or crop growth area 324 is located between the paths 314 and 315 and another crop growth area 325 is located between the paths 315 and 316 while another crop growth area 326 is located between the treated areas 316 and 317.

In each of the uncut or crop growth strips or areas as 321-326 row crops as 201-207 are located. Also, at the left side of row 311; i.e., at strip 320 as shown in FIGS. 1 and 2 the uncut area or strip 320 is one on which plants are grown. Similarly at strip 327, lateral of the path 317 row crops also grow.

The opration of this apparatus 25 accordingly creates an array of parallel treated and untreated strips, the treated strips, as 311-317, alternating with the untreated strips or areas 322-327. Row crops, as 202, grow in strip 322 and corresponding rows of row crop 203-207 grow in the other rows 323-327; additionally, row crops are grown on the strips, as 320 and 327, located respectively left and right of the treated area paths 311 and 317 (as shown in FIG. 1). In FIG. 9 stalks of the row crops are shown to show, diagrammatically, the location of the set of cuts produced by blades of reels 74 and 84 of apparatus 24 during the operation of that apparatus.

The showing in FIG. 9 for the cut pattern resulting from action of the blades of reels 74 and 84 on the strip 314 is typical of the action of the blades of the other reels 71-77 and 81-87 of the apparatus 25. In operation of the apparatus embodiment 25 each of the V-shaped blades and the straight blades on the reel in front of them cooperate to form uniformly sized and spaced cut areas of predetermined depth, length and width in each of the increments of the treated areas or paths, as 311-317. A representative area of such path is shown in FIG. 9.

The V-shaped blades on each of the rear reels, as blades 140, 160, 161, and 162 cooperate with the straight edged blades on each of the front reels, as 84, which blade edges extend parallel to the axis of the front reel assembly shaft (such as the blades 137 and 138 of reel 84).

In each of the portions of each of the treated paths, as 314, as shown in FIG. 9, the series of V-shaped blades from a series of V-shaped cuts which V-shaped cuts have their apex pointed to the rear of or opposite to, the direction of motion 301 of the apparatus 25. The angle is formed between the portions of the cuts is open in the direction of motion 301 of the apparatus 25 as shown in FIG. 9. Each V-shaped blade as 140, 160, 161, 162, and 163 forms a V-shaped cut. One, left, side of such a cut is shown as the cut 395 in FIG. 9 while the right hand portion of the V-shaped blade which formed cut 395 forms a cut as 375 along the path 314. The totality of ten blades on the reel 74 form a pattern of equally spaced diagonal cuts as 371-377 over the right hand side of the path of travel 314 of the apparatus 26 and the left hand side of each V-shaped blade forms a series of cuts as 391-397 which similarly extend diagonally and forward of the path of travel; cuts 391-397 extend diagonally leftward and forward while cuts 371-377 extends diagonally to the right and forward.

Each of the horizontally extending edges of the blades, as blades 137 and 138, of each of the front reels, as 84 (shown in FIG. 3) and like edges of the blades of the other front reels 81-87 form cuts in the earth such as cuts 381, 382, and 383 made by blades of the reel 84; e.g., corresponding cuts as 386', 387', and 388' are made by blades of reel 85 in path 315 and cuts 386, 387, and 388 are made in path 313 of the reel 83.

The following discussion of patterns of cuts provided by action the reels 84 and 74 is typical of all the patterns of cuts formed in paths 311-317 by the other reels of sets 81-87 and 71-77 of embodiment 24. The cuts 381-383 extend parallel to the front reel shaft 50 on the ground 23 and transverse to the length of the path 314 of the reels 84 and 74. Accordingly, the cuts 381, 382, and 383 intersect the cuts 371-377 and 391-397 and form the patterns of cuts as shown in FIG. 9. Such pattern provides that the intersection of the cuts, 381, 382 form, with the cuts 371 & 373 on the right side of the path 314 of the reel 74 a series of trapezoidal-shaped zones as 351-355. On the left side of the path 314 of the reels 84 and 74 the intersection of the transversely (to path 301) extending cuts, as 381 and 382, form, with the diagonally extending cuts 391 & 393, a series of trapezoidal zones 361-365 which are the same size as, but mirror-image, shaped relative to, the areas 351-355.

The cuts 382 and 383 form, with the diagonal cuts 375 & 377, a similar set of trapezoidal-shaped zones 351'-355' corresponding in size and shape and relative position—on the right side of 314—to the trapezoidal zones 351-355. Similarly, trapezoidal zones 361'-365' are formed on the left hand side of the path 314 of the reels 74 and 84 similar to areas 361-365. The distance between the cuts 381 and 382 is shown as 384 in FIG. 9; and such distance is the same distance as between cuts 382 and 383. Such distance 384 is the distance between the cuts formed by the blades on the reel 84. Inasmuch as the blades on the rear reel 74 are located on circular plates 171 and 172 and the plates as 171 and 172 have the same diameter as the plates of the reel 84, but move at twice the rotation speed of the plates on reel 84, because of size relation of sprockets 305 and 306 on shafts 50 and 55, the distance, measured along the direction of travel 301 of the reel 74 (which distance is shown as 385 in FIG. 9) of cuts made by reel 74 blades is only half the distance between the cuts 381 and 382 or like cuts made by reels such as reel 84.

Accordingly, the apparatus of embodiment 25 provides a plurality of like treated areas 311-317 spaced apart by untreated areas as 321-326 and, in each unit portion of length of each of those treated paths, as the length of path 314 between cuts 381 and 382 and the length between cut 382 and 383, the earth is cut into trapezoidal patterns of fixed size and shape continuously by apparatus 25 because the pattern of cuts in each of the zones between cuts as 381 and 382 in path 314 is the same as the pattern of cuts in each preceding increments of path 314 (as between cuts 382 and 383). More particularly, such uniform cutting along each of the increments of length of paths of the blades of the reels as 71-77 and 81-87, provides repeated like cut increments of area in each path as 314, as the increments 351-355 and 361-365.

Also, as the movement of the rear reel, as 74 is twice the rotative speed of the front reel, while each front reel as 84 moves in a direction 301 at a steady speed, for example, four miles an hour, each rear reel as 84 has its lowermost blade moving horizontally with a four mile per hour rearward motion relative to the earth which the blades of such reel contact and so urge and displace each of the increments of treated earth as 351-355 (and 361-365) rearwardly and in a direction perpendicular to the direction of length of the portion of the blade which contacts such increment of ground. Thus, each of the portions of the V-shaped blades which form the cuts 371, 373, 375, 377 also turn and move the earth contacted thereby to the rear and to the right. The blades of reel 74 and like reels thus provide a peeling and a turning action on the portions of earth as 351-355 which are located as deeply the depth of the cut to which the edges of the blades, as 140, 160, 161, and 162 extend into the ground.

In the particular embodiments 25 and 26 the apex or angle 163 of each V-shaped blade, as 161 in reel 74, in apparatus 25 and the like reels in embodiment 26 is attached to a center plate as 173 of a reel as 74 and such point of attachment of the blade 161 to the center plate 173 is at a location halfway between (a) the attachments of the next blade (as 162) in series with that blade (as 161) to the side plates, as 171 and 172 on that reel 74 and (b) the attachment of that blade (161) to those plates 171 and 172.

In the particular embodiment herein described the edge to edge diameter of blades on each reel as 74 is 21 inches and the cut to cut distance across each increment as 353 is 3.4 inches (transverse to the width of the cuts 381, 382, and 383). The front to rear length between cuts as 381-382 is one tenth of the perimeter of the reel 84 blades times the diameter, 21 inches, of that reel, or 6.6 inches.

Each portion as 353, 355 is turned and moved by the blades of rear reels as 74 toward strips as 321-327 whereat the stalks of the field crop being cultivated are located. Thus, in the particular path 314 covered by the apparatus 25, the right hand portion of the blades of the rear reel 74 move the earth in the treated zone 314 toward the untreated zone 324 while the portion of the blades on the left hand side of the apparatus reel 74 throw the earth from zone 314 toward the zone 323. Corresponding portions of the blades in other reels throw the corresponding portions of earth toward the corresponding adjacent laterally located uncut areas on which the field crops are located.

Figure 10:
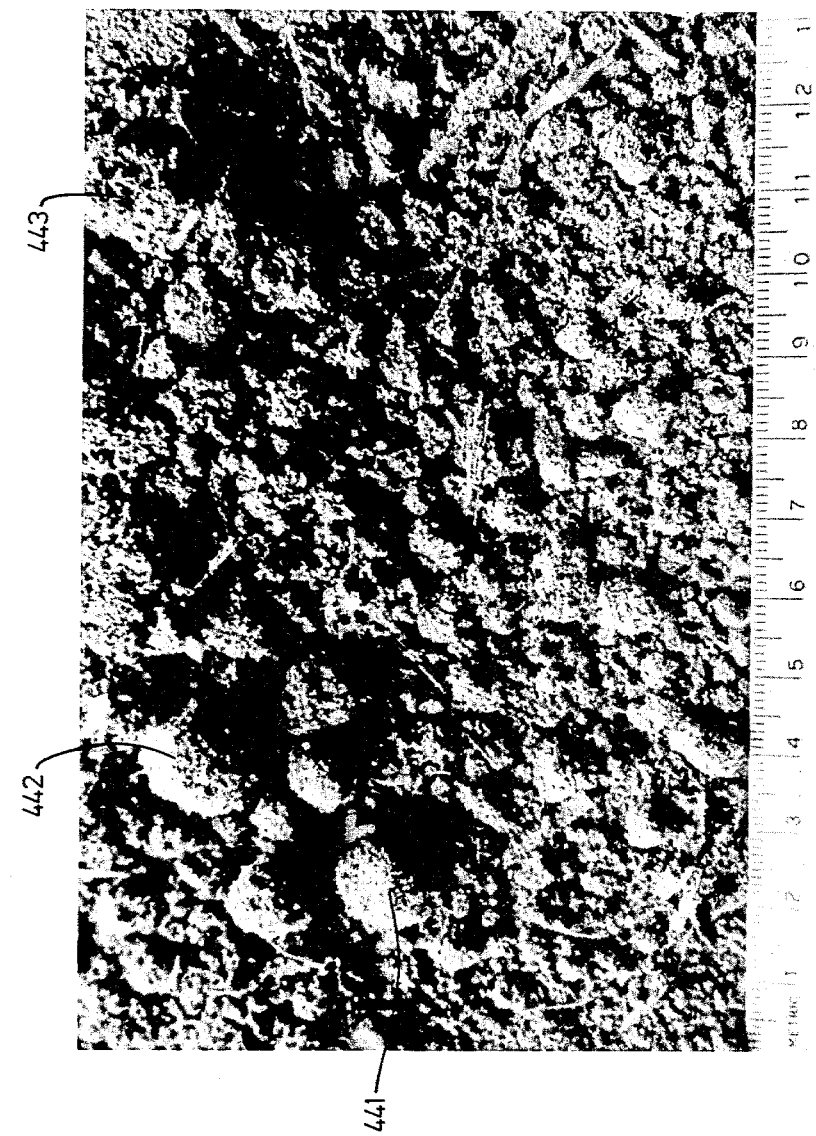
FIG. 10 is a photograph of a representative portion of the earth in zone 9A of FIG. 2 which earth had been treated by the apparatus of embodiment 25 of this invention. Such portion of earth is located in a zone as zone 10A of FIG. 9.

The result of such cutting to predetermined depth of sections of earth of fixed cross-sectional areas assists so the size distribution of the earth particles created by such action of the blades, as 74 and 84 and like blades in the sets 71–77 and 81–87 is that the size distribution of the particles is set out in FIG. 8. FIG. 8 is a graphical representation of the sizes of the particles of the earth produced by the action of the reels as 71–77 and 81–87 of the apparatus 25 traveling at four miles per hour over earth of standard percent humidity. FIG. 8 shows that the particle sizes produced by apparatus 25 are limited in maximum size and, also, have definite ranges of particle size, which provide a porous mass of earth, which is shown in FIG. 10 to show the texture thereof. FIG. 10 also shows a millimeter rule so that the size of particles and porosity of the product may be readily visualized. Such a porous product is very receptive to holding water and aids plant sprouting. The small amount of fines and absence of large particles and the prevalence of most of the particles within a size range that is from twenty percent to one hundred percent of a given size (or, otherwise expressed, three centimeters plus or minus fifty percent) for over fifty percent of the weight particles provides a porous mass as shown in FIG. 10.

The production of particles of one to three centimeter size also provides for preservation of bacteria in the soil.

The angle which the edge of the left part (A) of blade 161 of apparatus 24 makes with a flat plane passing through the axis of rear shaft 55 and the vertex of angle 163 is related to the angle which the edge of the right portion (B) of blade 161 makes with that flat plane passing through the axis of shaft 55 and the vertex of angle 163 in the same way that the angle of incidence of light on a flat surface is related to the angle of reflection thereof; i.e., equal in size but opposite in direction relative to the same flat plane, or a mirror image thereof. The term "mirror image" is accordingly used to express the relation of the equal yet opposite relation of the angles of the edges of the V-shaped blades of reel 84 and all of the other reels 81–83, 85–87 and also of edges of blades 212–220 of embodiment 26.

The apparatus of this invention as shown by embodiment 25 and process of its operation as above described accordingly provide that earth treated thereby is formed into agglomerates or particles of sizes primarily between ½ and five centimeters diameter, as 441, 442, and 443 (in FIG. 10) so that, in the overall as shown in FIG. 10, a porous mass is produced. Such porous mass provides for good retention of water and plant growth rather than providing a growth support medium composed of predominantly extremely fine particles, which mass would provide for packing and water runoff, or very large particles.

Additionally, the range of particle sizes that are produced by the apparatus as 25 of this invention maintain the biological activity of the bacteria content in the soil treated thereby as above described. Such bacterial content is recognized as improving the growth rate and reliability of plants rooted and/or planted in such type soil. The relative uniformity of the size of the large particles as shown by the graph of particle size of FIG. 8 and the photograph of FIG. 10, which illustrate the porosity of the treated earth formed by apparatus 25 operation and, also, the large number of particles of ½ centimeters in size and over and absence of particles over five centimeter size.

The biological activity of the large particles is shown by that five days after operation of the apparatus as 25, samples of soil produced thereby and shown in FIG. 10 were taken. Earthy particles of about one centimeter size as 442 in FIG. 10 were then broken open and powdered and provided extensive examples of bacterial content while the same weight of the small size particles; i.e., particles less than one millimeter in diameter so treated and tested showed substantially less bacterial activity. This biological activity is shown by the use of a plate of ordinary raspberry flavored Jello-O with tap water and sugar. The Jello-O medium was put on plates about five inches in diameter and one half inch deep and thereupon one gram of the large size particles was crumbled up—i.e., powdered—and put into the several (five) like dishes of such Jello-O and such Jell-O protected from material dropping thereinto by placing a plate thereover so that no material could drop into the plate. Similar plates of Jello-O of the same size and shape and Jello-O content were injected with the same volume of particles of earth that had less than one millimeter diameter size, were similarly broken open or powdered and stored with the dishes of large particle powdered medium. Five days after such injections there was clearly about five times as much bacterial growth in the dishes or plates which had been injected with powder from the large size (one centimeter diameter particles) than with the powder made from particles with one millilimeter or less diameter.

The tractor 22 shown in system 20 of FIGS. 1 and 2 is an 80 to 100 h.p. tractor and the operations described above for apparatus 25 are performed at four to six miles per hour. Speeds may vary usually from three to ten m.p.h. depending on the tendency of the soil to pulverize (when operations are slowed): when the soil is moist and breaks very well the speed of operation may be increased.

The ground is chopped by the blades of reel assembly 35 to a depth of two to three inches and such is done for any given soil in a uniform manner. The distance between center members 42 and 43, and between members 43 and 44 is 30 inches measured in direction parallel to axis of shaft 50 and blades of reels as 74 have a corresponding side to side width. The reels 171, 172, 135, and 136 are 18 inches in diameter. The blades as 137 and 138 are 21 inches long from left side as shown in FIG. 3 to the right side. Reel center plate 173 is 20 inches in diameter and the edge to edge diameter of the blades on reel 84 is 21 inches. Also, the distance from the apex of one blade, as 162, on a rear reel of assembly 60 as shown in FIG. 7 to the corresponding apex portion of a diametrically opposite blade as 167, as shown in FIG. 7 would be 21 inches. FIGS. 1, 2, and 3 and 10 are drawn from photographs and relative sizes may be determined quantitatively from such photographs. The shafts 50 and 55 may be made of 1½ inch square tubing.

The system of this invention also comprises a tractor 22, an apparatus 26 and the land 23 on which the apparatus and tractor operate.

The apparatus 26 is another embodiment of apparatus according to this invention. It comprises a frame 90 and a reel assembly 241. The frame comprises a front transverse member 431, a middle transverse member 432, and a lower transverse member 433. These members are arrayed as shown in FIGS. 5 and 6. Members 431, 432, and 433 are rigid, straight, horizontal channel members made of steel. Members 431, 432, and 433 are attached to rigid diagonal frame members 434 and 435, as shown in FIG. 6. The frame members 431 is firmly attached to a hitch 34. The hitch is attached to the frame of the tractor 22 in conventional manner to allow the frame to be drawn and for purposes of maneuvering the tractor and apparatus 26. The frame 90 also comprises rigid longitudinal members 91, 92, 93, and 94 (see FIG. 5); each member 94, 91, 92, and 93 extends horizontally and is attached at its front end to the rear transverse frame member 433 and extends from that frame member rearwardly.

A front reel shaft 122 is rigid and straight and extends across the frame 90 from the left side longitudinal member 91 to the right side longitudinal member 94. Front and rear journal housings are provided and firmly attached to the bottom of each of the longitudinal members 91-94. The housing of front journal 64 and rear journal 66 on longitudinal member 44 and front journal housing 65 and rear journal housing 67 on member 45 are typical of, but lighter than the journal housing provided on each of the longitudinal members 91-94.

A heavy front reel shaft 122 is rotatably attached at journals to each longitudinal member 91, 92, 93, and 94; e.g., at journal 95 to member 91 and at a journal as 97 at member 94 and at like journals to members 92 and 93 which members also support sprocket and chains as at sections 7A—7A' and section 7B—7B' of FIG. 4.

A rear reel shaft 222 is rigid and straight and rotatably supported on each of longitudinal members 91-94. That shaft 222 is rotatably supported on each of those longitudinal members by journal bearings as 96 on member 91, journal 98 on member 94 as diagrammatically shown in FIG. 5 and at 92 and 93 by journals.

Each of the rear reel assemblies 212-220 are alike to the reel 74 shown in FIG. 3 and is firmly attached to the shaft 222. Each of the front reel assemblies 111-121 are alike to the reel 84 shown in FIG. 3 and is firmly attached to the shaft 122.

Thus, the reel unit 116 is composed of left side plate as 135, a right side plate as 136 and ten like blades, as 137 and 138.

Also, each of the rear reels 212-220 are alike and the description given for rear reel 74 applies to each of the group of 212-220. The reel 211, however, comprises only two vertically extending flat circular rigid plates, corresponding to plates 172 and 173 of reel 74 and radially equispaced straight edges blades, each like the right side portion (B) of the blade 161 and other like V-shaped blades, as 140, 161, and 162 of reel 74 of embodiment 25. Reel 221 is a mirror-image of reel 211 and comprises two plates, as plates 171 and 173 of reel 74, and ten blades each like the left side portion (A) of the blade 161 and other like blades of reel 74 of embodiment 25.

Adjacent to the junction of journal for shafts 122 and 222 to member 92 a first rigid toothed sprocket like 305 is firmly attached to the shaft 122 and a second, rigid toothed sprocket of exactly one half the diameter of the first sprocket is firmly attached to the shaft 222. A chain as 307 extends in a substantially straight line from the top of the toothed sprocket on shaft 122 to the top of the toothed sprocket on shaft 222 and is firmly wrapped around the teeth of such sprocket and extends with only an operative amound of slack (e.g., ⅛ to 1/16 inch) from the bottom of the second sprocket to the bottom of the first sprocket and firmly engages the teeth of the first sprocket and extends around that first sprocket to be continuous with the top portion of the chain. Such chain provides for driving the shaft 222 by the shaft 122. The shaft 122 is driven by engagement of the teeth of reels 111-121 with the ground and shaft 222 by the second sprocket thereon. A like part of sprockets and chain is attached to shafts 122 and 222 adjacent to journals for shafts 122 and 222 near or at member 93 of embodiment 26.

Figure 5:
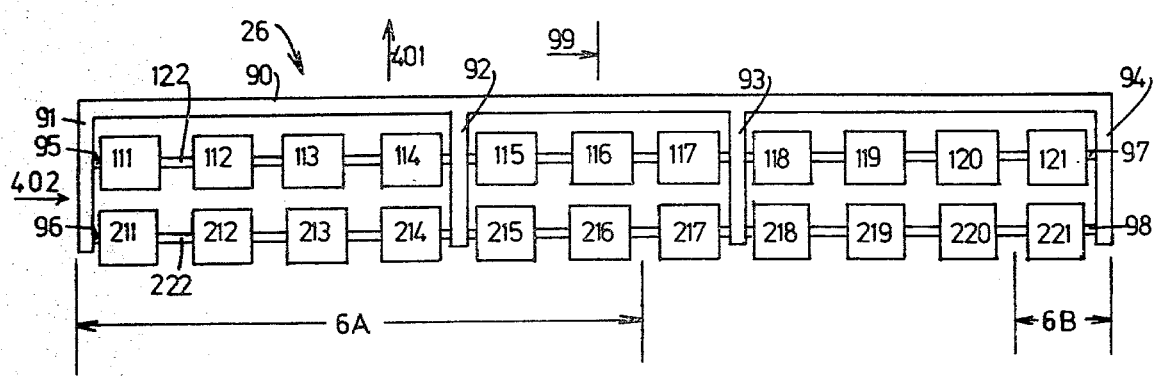
FIG. 5 is a diagrammatic top view of the major components in the reel and frame assembly of another embodiment of apparatus, embodiment 26, of this invention.
Figure 6:
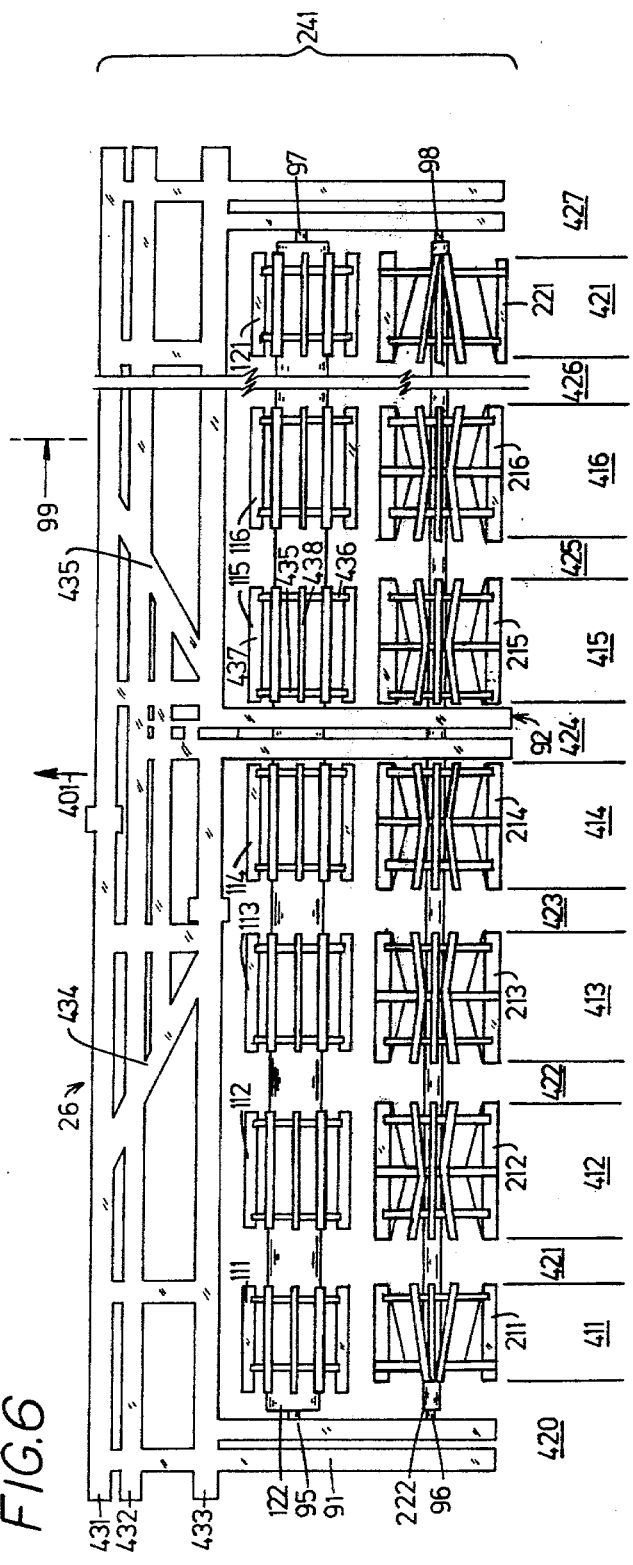
FIG. 6 is a diagrammatic top plan view of the portions of embodiment 26 shown as portions 6A and 6B of FIG. 5.
Figure 11:
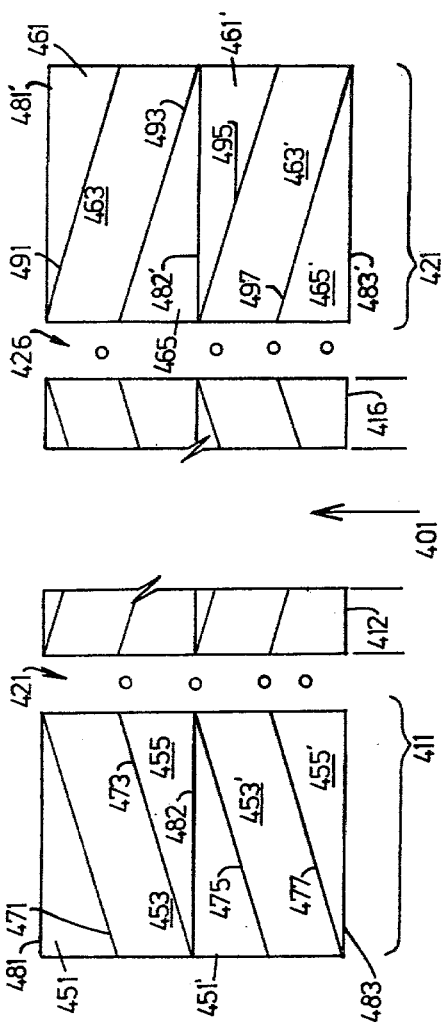
FIG. 11 is a diagrammatic showing of pattern of cuts in the earth made by the blades of the reels 211 and 221 of embodiment 26.

In operation of the embodiment 26 of system 20 as shown and referred to in FIGS. 1, 5, and 6 the reel assemblies 111-121 and 211-221 move forward in direction 401 as shown in FIGS. 4, 6, and 11 and rotate about the axles 122 and 222 in a counterclockwise direction as seen in direction 402 of FIGS. 5 and 6. The reels 111-121 then move in a longitudinal direction 401 at the same speed over the land as do the reels 211-221. However the reels 211-221 rotate at twice the rotation speed of the rotation speed of the reels 111-121. The blades of the reels 111-121 engage into and cut into the ground to a depth substantially that of the length of extension of the edges of the blades beyond the edges of the plates as 136 and 137.

During operation of the apparatus 26 the tractor 21 moves across a field, as 23, with rows of crops thereon (as rows 200-407) drawing the apparatus 26 therebehind. The apparatus 26 while so drawn is partly supported on the front reel side frame plates as 135 and 136 and partly by edges of the blades of all of the front or forward set of reels 111-121 and, also, partly by edges of the blades on each of the reels 211-221 and plates as 171, 172, and 173 on each of such reels. The hitch 34 is firmly attached at its front end to the frame of the tractor and is attached at its rear portions to frame member 431 of apparatus 26.

As the tractor 22 draws the apparatus 26 therebehind along the ground 23 the sharp edges of the blades of the reels 111-121 and 211-221 engage in the ground. The paths of each of the reels of apparatus 26 are generally as shown in FIG. 6, namely with the treated areas as 411-421 behind each of the rear reels as 211-221, as shown in FIG. 6, and also, with untreated areas 421-426 between the treated areas; e.g., uncut or crop growth area 421 between paths 411 and 412 and another uncut or crop growth area 425 (to the right as shown in FIG. 6 of the path 415) which area 425 is located between the cut areas 415 and 416. Similarly uncut or crop growth areas 422, 423, 425, and 426 are located between the paths 412 and 413, 413 and 414, 415 and 416, and 426 and 427, respectively.

In each of the uncut or crop growth strips or areas as 421-426 row crops (as 201-207) are located. Also, at the left side of row 411; i.e., a strip 420 as shown in FIG. 6 the uncut area or strip 420 is one on which plants are grown. Similarly at strip 427, lateral of the path 417, row crops also grow.

The operation of this apparatus 26 accordingly creates an array of parallel treated and untreated strips, the treated strips, as 411-416, alternating with the untreated strips or areas 421-425. Row crops, as 202, grow in strips as 421-425; additionally, row crops are grown in or on the strips, as 420 and 427, located respectively left and right of the treated area paths 411 and 417.

The V-shaped blades on each of the rear reels, as 212-220, cooperate with the straight edged blades on each of the front reels, as 112-120, of embodiment 26 which front reel blade edges extend parallel to the axis of the front reel assembly shaft 122 in the same manner as blades as 140, 160, 161 on the rear reels of embodiment 25 cooperate with the straight edge blades on each of the front reels as 84 of embodiment 25, to form uniformly sized and spaced cut areas of predetermined depth, length and width in each of the increments of the treated areas or paths, as 411-416 in the same way as shown in FIG. 9 and above described. The showing in FIG. 9 for the cut pattern resulting from action of the blades of reels 74 and 84 on the strip 314 is, accordingly, typical of the action of the blades of the reels 212-220 and 112-120 of the apparatus 26.

The long thick rigid shaft 122 that extends from arm 91 to arm 94 is sufficiently thick and rigid to maintain its longitudinal axis straight under stress and serves to apply more force on any harder portion of the soil than on the softer portions of soil of equal height engaged by the reels 111-121; such straight rigid shaft also serves to apply more force on the higher portions of soil engaged by reels 111-121 than on the lower portions. Thereby embodiment 26 produces a tilled soil of particularly even height across the entire array of paths as 411-421. Therefore, in view of porosity of the product of such operation as shown in FIG. 10, apparatus 26 provides for a particularly effective distribution of water to the crops in the strips as 421-425 between the treated areas as 411-416 over the entire path of apparatus 90.

Additionally, in embodiment 26 reel 211 is essentially the right hand side of a reel as 212-220 and 74 and forms cuts corresponding to the right hand side of such reels, while reel 221 is essentially the left hand side of a reel as 212-220 and 74 and forms cuts corresponding to the left hand side of such reels.

In each of the portions of each of the treated paths, as 411 as shown in FIG. 11, the series of angled blades on that reel form a series of cuts at an angle to the direction of the path (401) of the apparatus 26: such cuts are referred to below as angled cuts. Such angled cuts have an outer end pointing toward the rear of, or opposite to, the direction of forward motion 401 of the apparatus 26. The totality of ten blades on the reel 211 form a pattern of equally spaced diagonal cuts as 471, 473, 475, 477 over the path of travel 411 of the apparatus 26 and what amounts to the left hand side of V-shaped blade of reel 221 forms a series of cuts as 491-497 which also extend diagonally and forward of the path 401 of travel. Cuts 491-497 extend diagonally leftward and forward while cuts 471-477 extend diagonally to the right and forward.

Each of the horizontally extending edges of the blades of each of the front reels, as 111-121 form cuts as 481, 482, and 483 in the earth such as cuts 381, 283, and 838 made by blades of the reel 84 and corresponding equi-spaced cuts as 481', 482', and 483' are made in path 421 of the reel 221.

The discussion of patterns of cuts provided by action of the reels 84 and 74 is typical of all the patterns of cuts formed in paths 411-416 by the reels 112-120 and 212-220 of embodiment 26. The cuts 481-483 extend parallel to the front reel shaft 122 on the ground 23 and transverse to the length of the path 411 and 421 of the reels 211 and 221. Accordingly, the cuts 481, 482, and 483 intersect the cuts 471-477 and 491-497 and form the patterns of cuts as shown in FIG. 11. Such pattern provides that the intersection of the cuts, 481, 482 form, with the cuts 471 and 473 (and 475 and 477) in the path 411 of the reel 211, a series of trapezoidal-shaped zones as 451, 453, and 455. Along the path 421 of the reels 121 and 221 the intersection of the transversely (to path 401) extending cuts, as 481' and 482', form, with the diagonally extending cuts 491 and 493, a series of trapezoidal zones 461', 463', 465' which are the same size as, but mirror-image, shaped relative to, the areas 451, 453, and 455.

Inasmuch as the blades on the rear reels 211-221 have the same diameter as the plates of the front reels 111-121, but move at twice the rotation speed of the front on reels, because of size relation of sprockets on shafts 121 and 122, the distance, measured along the direction of travel 401 of the reels, of cuts made by rear reel blades is only half the distance between the cuts made by front reels.

Accordingly, the apparatus of embodiment 26 provides a plurality of like treated areas as 411-416 spaced apart by untreated areas as 421-425 and, in each unit portion of length of each of those treated paths, as the length of path between cuts 481 and 482 and the length between cuts 482 and 483, the earth is cut into trapezoidal patterns of fixed size and shape continuously by apparatus 26 because the pattern of cuts in each of the zones between cuts as 481 and 482 in path as 411 is the same as the pattern of cuts in each preceding increments of path 411.

Each portion as 451, 453, and 455 (and 461, 463, and 465, respectively) is turned and moved by the blades of rear reels as 217 (and 221) toward adjacent strips as 421 (and 426, respectively) whereat the stalks of the field crop being cultivated are located.

I claim:

1. An apparatus comprising a horizontally extending frame and a plurality of reel and shaft assemblies A. said frame assembly comprising a front rigid frame unit extending in a first direction, said first direction being the direction of the width of said frame, and a plurality of longitudinally extending frame members, each attached to said front frame unit and extending in a second direction transverse to said first direction, said longitudinally extending members being spaced apart from each other along said first direction, B. said reel and shaft assembly comprising a set of parallel axle shafts and a set of reels supported on each of said shafts, 1. said set of axle shafts comprising
   a. a front rigid shaft rotatably attached to said spaced apart longitudinal member of said frame, said front shaft having a longitudinally extending central axis, said axis extending parallel to said first direction, and
   b. a rear rigid shaft rotatably attached to said spaced apart longitudinal members of said frame, said rear shaft having a longitudinally extending axis, extending parallel to said first direction, and extending parallel to said axis of said front shaft, said axis of rear shaft being spaced apart from said axis of said front shaft at a distance along said second direction, 2. a plurality of like front reels firmly attached to said front shaft, each of said front reels comprising
   a. spaced apart rigid blade supports, each of said blade supports firmly attached to said front shaft and spaced apart along said first direction, each of said blade supports comprising a rigid member extending vertically and also extending in said second direction to the periphery of said rigid member,
   b. and a plurality of ground engaging blades, each of said ground engaging blades firmly attached to said blade supports near the periphery thereof and each said blade having a straight peripheral edge, said peripheral edge of each of said blades on each of said front reels located at the same distance measured transversely to said front shaft, each of said blade edges extending parallel to and at equal distance from each other and extending circumferentially of said front shaft, said ground engaging blades extending in said first direction between and attached to two of said spaced apart blade supports attached to said front shaft, 3. A plurality of like rear reels firmly attached to said rear shaft, each of said rear reels comprising a. three spaced apart rigid blade supports, each of said supports firmly attached to said rear shaft and spaced apart along said firt direction, each of said three blade supports comprising a rigid member extending vertically and also extending in said second direction to a periphery of said rigid member, b. and a plurality of ground engaging blades, each of said ground engaging blades firmly attached to said blade supports near the periphery thereof and each said blade having a peripheral edge, said peripheral edge of each of said blades on each of said rear reels located at the same distance measured transversely to said rear shaft, portions of each of said blade edges extending parallel to and at equal distance from each other and extending circumferentially of said shaft, all portions of said peripheral edge of said ground engaging blades on said second reel extending at an angle to the axis of the rear shaft and extending in said first direction for the same length as the ground engaging blades on said first reels, 4. means connecting to said front shaft and said rear shaft to drive said rear shaft in the same angular direction as said front shaft and the peripheral edge of the blades on said rear set of reels in the same angular direction as and at a greater linear speed than the peripheral edge of said blades on said front set of reels, and wherein the peripheral edges of the ground engaging blades on the front set of reels are located in flat planes parallel to said central longitudinal axis of said front shaft, and wherein the peripheral edges of the ground engaging blades on the rear set of reels are located in flat planes which are intersected by the axis of said rear shaft.

2. Apparatus as in claim 1 wherein said blades on said rear set of reels are V-shaped blades, one portion of each of which blades intersects the other portion of each of said blades at an angle, and wherein one of said blade portions is located in a flat plane which plane is intersected by the axis of said rear shaft at one angle and the other of said blade portion edges is located in a flat plane which is intersected by the axis of said rear shaft at a second angle different from said one angle.

3. Apparatus as in claim 2 wherein said one angle and said second angle on said blade on the second set of reels are mirror images of each other.

4. Apparatus as in claim 3 wherein all of said reels on said second shaft are alike in structure.

5. Apparatus as in claim 2 wherein said reels are arrayed on both sides of the center line of said frame in a mirror-image relationship.

* * * * *